United States Patent [19]

Guilbert

[11] Patent Number: 4,605,710

[45] Date of Patent: Aug. 12, 1986

[54] HIGH TEMPERATURE WIRE COATING POWDER

[75] Inventor: Curtis R. Guilbert, St. Paul, Minn.

[73] Assignee: Minnesota Mining and Manufacturing Company, St. Paul, Minn.

[21] Appl. No.: 720,334

[22] Filed: Apr. 5, 1985

[51] Int. Cl.$^4$ .................. C08L 67/02; C08L 63/06
[52] U.S. Cl. ..................... 525/438; 525/533; 528/289
[58] Field of Search ............ 525/438, 533, 423; 528/289

[56] References Cited

U.S. PATENT DOCUMENTS

| | | | |
|---|---|---|---|
| 3,346,665 | 10/1967 | Schwarzer | 525/504 |
| 3,663,651 | 5/1972 | Traut | 428/379 |
| 3,853,817 | 12/1974 | Weddleton | 528/220 |
| 4,140,728 | 2/1979 | Hahn | 525/438 |
| 4,255,553 | 3/1981 | Mizumura | 525/533 |
| 4,277,583 | 7/1981 | Waitkus | 525/423 |
| 4,362,861 | 12/1982 | Shen | 528/289 |
| 4,424,313 | 1/1984 | Meyer | 525/438 |

Primary Examiner—John C. Bleutge
Assistant Examiner—Patricia Short
Attorney, Agent, or Firm—Donald M. Sell; James A. Smith; Gerald F. Chernivec

[57] ABSTRACT

A powder composition capable of being fused and cured on electrical wire to provide a thermally stable electrically insulative coating thereon, comprising a blend of a carboxyl-terminated polyester resin, a diimide diacid and a triglycidyl isocyanurate.

5 Claims, No Drawings

HIGH TEMPERATURE WIRE COATING POWDER

TECHNICAL FIELD

The invention relates to a powder which is useful for application as a coating to wire, to act as electrical insulation therefor, and especially in higher thermal class operating areas.

BACKGROUND ART

Wires, such as typically used in the windings of transformers and motors, have been insulated with enamels applied from an organic solvent, the application of which can involve health, fire and air pollution hazards. To avoid such problems, the wire could instead be insulated by, for example, kraft paper, but such a process is typically slow and expensive, undesirably increases the bulk of the wire winding, and would be inapplicable in high temperature use areas, e.g., at 180° C. and higher.

Of the high temperature enamels, the most common are based on polyesters, and especially modified polyesters such as polyester amides and polyester imides. While such materials have proven to have great utility because of their effective electrical insulating properties, physical toughness and resistance to heat and solvent, together with reasonable costs, the aforementioned disadvantages remain as drawbacks to the use of such enamels.

Accordingly, it has been deemed desirable to utilize a solvent-free process for the application of a film-type insulation to electrical conductors. One leading non-solvent process for such applications utilizes powder coatings. Currently, known powder systems are typically based on epoxy or polyester resins, and as such are capable of providing an insulation system which is equivalent to many enamels. For example, one such epoxy-based powder which has found excellent commercial acceptance is that disclosed in U.S. Pat. No. 4,267,300. Similarly, another epoxy-based composition is disclosed in U.S. Pat. No. 4,486,558. Such compositions are, however, limited to thermal classes of below about 130° C. because of their base polymer composition. At temperatures above about 130° C., coatings from these compositions can form cracks therein, resulting in dielectric failure. While a higher thermal class powder wire coating is highly desirable, I am unaware of the commercial availability of same.

In contrast with the foregoing, I have now discovered a composition which combines the high temperature characteristics of the 5-membered imide ring and the isocyanurate ring structures with the advantages and economies of a solventless powder coating system.

The composition is based on the combination of a solid carboxyl-terminated polyester resin produced from aromatic diacids and aliphatic glycols; a diimide diacid; and a triglycidyl isocyanurate. In this regard, it should be pointed out that while my composition need not contain conventional epoxy resins, the relatively fast epoxide/carboxyl reaction compares favorably with the fast cure properties known for epoxy resin/anhydride powder systems.

The use of the foregoing diimide diacid as a polyester component for enamels is disclosed in U.S. Pat. Nos. 4,145,334; 4,145,351; and 4,362,861. Furthermore, this diimide diacid has been disclosed as a polyester component in hot melt adhesive systems, namely in U.S. Pat. Nos. 4,038,254 and 4,075,179. In addition, the diimide diacid has been disclosed as a component in polyester imides used in preparing powders for coating wire in U.S. Pat. Nos. 4,117,032; 3,853,817; and 4,233,435.

In this prior art, the diimide diacid is taught to be copolymerized into a polyester, rather than used as a separate chemical constituent. Separate use allows for greater formulation flexibility. In addition, the elimination of the imide linkages in the polyester backbone enhance the flow properties of the resultant powder, since such linkages increase the melt viscosity of the polyester. Furthermore, the elimination of such linkages allows for the use of a higher molecular weight polyester than before available, resulting in enhanced flexibility of the ultimate coating.

DISCLOSURE OF THE INVENTION

In accordance with the invention there is provided a powder composition suitable for preparation of a thermally stable electrically insulative coating on wire when same is fused and cured thereon. The composition comprises a blend of an effective amount of a carboxyl-terminated polyester resin, preferably derived from an aromatic diacid and an aliphatic glycol; an effective amount of a diimide diacid; and an effective amount of triglycidyl isocyanurate to react with the acid functionality.

The composition can provide a fused coating on electrical wire displaying excellent thermal stability when such wire is utilized as electrical insulation in transformers, motors, etc.

DETAILED DESCRIPTION OF THE INVENTION

The novel powder of my invention first comprises a solid carboxyl terminated polyester resin derived from at least one aromatic diacid and at least one aliphatic glycol. A wide range of glycols can be utilized, examples including ethylene, propylene, butylene, etc. Similarly, a number of diacids are capable of functioning, examples including adipic, azelaic, phthalic, isophthalic, terephthalic, etc. Minor amounts of an aliphatic diacid are not detrimental. A preferred combination is a low molecular weight isophthalate terephthalate neopentyl glycol polyester which has been end-capped with carboxylic acid functionality, commercially available as "Arakote 3003" from Ciba Geigy.

The molecular weight of the polyester component should preferably be less than about 10,000 to provide a suitable melt viscosity for melt processing, e.g., via extrusion techniques, and the capability of producing a grindable melt under normal conditions, although higher molecular weights are capable of being utilized with, for example, cryogenic grinding techniques.

At below about 2,000 molecular weight, film flexibility is generally reduced to an unsatisfactory level.

The second component of my powder is a diimide diacid, which results from the reaction product of a tricarboxylic acid anhydride and a diamine. An example of a highly preferred anhydride is trimellitic anhydride. Combinations thereof with other anhydrides such as phthalic anhydride, pyromellitic dianhydride, benzophenone dianhydride, etc., may be used.

An exemplary and preferred diamine is methylene dianiline. Further, an isomeric mixture of methylene dianiline, known commercially as "Curithane 103", from Upjohn, is also acceptable, as well as other aniline derivatives, such as diaminodiphenyl sulfone, phenylene diamine, diaminobenzophenone, diaminodiphenyl ether, diaminodiphenyl sulfide, etc. The third component is triglycidyl isocyanurate, which provides excellent processing and other characteristics to the powder, such as melt processing properties, reactivity and thermal stability. Other epoxies can also be utilized in conjunction therewith, such as novolak epoxies, bisphenol-A epichlorohydrin derivatives, cycloaliphatic epoxies, etc., although their addition may tend to reduce the thermal stability of the powder.

The diimide diacid should be present at a concentration of at least about 5 weight percent to achieve desired thermal stability. At a concentration of greater than about 40 weight percent, the melt viscosity of the powder is such that melt processing becomes difficult. The ratio of the polyester component to diimide diacid component determines the melt viscosity of the powder coating and flexibility of the fully cured film. Weight ratios of polyester to diimide diacid less than about 0.9 may result in a melt viscosity of the final powder too high to flow out as a continuous film, and result in reduced flexibility of the finished coating.

The isocyanurate should be present at a mole ratio of epoxide functionality to total acid functionality of from about 0.8 to about 1.5, with about 1.25 being preferred.

In my preferred embodiment, when optimum component concentrations are utilized, conventional catalysts known to accelerate epoxide/carboxylic acid interaction are unnecessary because the system is self catalyzing. (Such catalysts typically have a deleterious effect on electrical properties.)

If a catalyst is deemed necessary, stannous salts such as stannous octoate are particularly exemplary.

It is preferred to not utilize pigments or fillers in my powder, because such components can tend to be deliterious to electrical properties. Furthermore, the diimide diacid component provides the resultant film with a typically yellow color, thus making pigmentation unnecessary. If pigments are desired, such materials as "Cromophtal Red-3B", commercially available from Ciba-Geigy or iron oxides can be used at concentrations preferably not exceeding five percent by weight of the composition.

As is conventional in the art, powders such as that of my invention preferably contain flow control agents. An example of a suitable flow control agent is the fluorocarbon type such as "FC-430", commercially available from the Minnesota Mining and Manufacturing Company. In addition, the "Modaflow" (Monsanto Chemical) type of agent, a copolymer of 2-ethylhexyl acrylate and ethyl acrylate, can be effective, and preferably at concentrations of from about 0.1 to about 2.5 percent by weight, with about 1.5 percent being preferred. I have also found that a combination of the fluorocarbon agents with the "Modaflow" type is effective, and in fact preferred.

Such agents typically tend to minimize the formation of pin holes in the cured coating. Nevertheless, it may still be desirable to apply a second coating over any pin holes which have been formed in the first coating.

The powder is also preferably and conventionally mixed with finely divided silica to inhibit tendencies for the powder to block during storage and shipment and also to enhance fluidization thereof.

In a typical coating operation, a wire to be coated is cleaned and passed through a cloud of electrostatically-charged powder at ordinary room temperature, following which the powder-coated wire is heated to a sufficient temperature to fuse and cure the powder.

A large manufacturer of electrical distribution and power transformers employs a test called the Heat Shock Test to screen prospective insulating coatings. In this test, a coated wire specimen of from 10 to 14 inches in length is bent at a 90° angle over a mandrel having a diameter four times the thickness of the specimen in the direction of bending, and a second portion of the specimen is bent 90° over the mandrel in the opposite direction. Additional specimens are bent to provide at least four 90° bends to screen additional properties thereof. If the wire is not square or round, one wire specimen is bent in the direction of maximum thickness and another in the direction of minimum thickness, again using mandrels having diameters four times each wire thickness.

Each specimen is then placed in an oven at 175° C. for 30 minutes. After cooling to room temperature, the coating is inspected for cracks. Any visible crack constitutes failure. In this test, a range of coating thicknesses of a given powder is also tested. The thickest coating which then provides no visible cracks is an indication of the quality thereof. One leading manufacturer of electrical distribution and power transformers indicates a strong preference for materials which pass this test at thicknesses of at least about 7 mils total, i.e., 3.5 coating thickness.

The invention will now be more specifically described by the following non-limiting examples, wherein all parts are by weight unless otherwise noted.

EXAMPLE 1

A melt mixture of 920 parts of "Arakote 3003" containing 0.1 percent by weight of "FC-430" was made at 200° C. together with 180 parts of a diimide diacid, the reaction product of 2 mols of trimellitic anhydride with one mole of methylene dianiline. Melt mixing was undertaken in a conventional twin screw extruder. Prior to melt mixing, the diimide diacid was double passed through a conventional hammer mill to reduce its particle size to ensure satisfactory dispersion or solution in the polyester. The predispersed diimide diacid polyester was then dry mixed with a triglycidyl isocyanurate, "PT-810", commercially available from Ciba-Geigy, at 1136 parts predispersion and 170 parts of isocyanurate, together with 30 parts of "Modiflow II", tradename for a flow control agent commercially available from Monsanto Chemical.

The completed mix was then again passed through a conventional twin screw extruder at 125° C., after which the resulting melt was allowed to cool, and in conventional fashion, was ground via a hammer mill to form a powder. The powder had a gel time of approximately 30 seconds, determined by the conventional hot plate method at 204° C. Gel time should be in the range of from about 15 to 90 seconds, with from about 25 to 40 seconds preferred. Relative to particle size, 42 percent of the particles passed through a 400 mesh screen; 64 percent through a 325 mesh screen; 88 percent through a 200 mesh screen; and 100 percent through a 140 mesh screen. Particles should not be greater than about 100 mesh to minimize coating problems, and at least about 50 percent should pass through a 325 mesh screen to optimize attainment of a smooth film.

The powder was then applied to an 80×240 mil rectangular aluminum wire utilizing an electrostatic fluid bed, followed by fusing/curing into a smooth coating by passing the wire through a series of ovens. The electrostatic bed had an air flow of 100 SCFH; a bed voltage of 71 kv; and was operated with air having a moisture content of less than 10 parts per million. The oven system utilized 5 feet of infrared heaters with three zones, the first zone being maintained at 400°-600° F., the second at 500°-700° F., and the third at 600°-800° F., followed by 15 feet of an air impingement oven at 600° F. The line speed through the oven was 20 feet per minute for the wire. Resultant coating build was 7 mils total in a first sample, and 12 mils total in a second sample.

The thus coated wire passed a 175° C. heat shock test at 10-12 mils; provided a dielectric strength of from 5000-6000 volts; had a dissipation factor of 3 percent at 150° C.; and had essentially no voids or bubbles in the coated film. This data clearly indicates that the film has utility as a transformer insulation.

A thermal gravimetric analysis of the films of this example illustrated a 5 percent weight loss at a temperature approximating 350° C., clearly indicating the composition has 180°-200° C. thermal oxidative stability. Further, oven aging of samples at 200° C. for over 4,500 hours have resulted in no film discoloration or dielectric failure, i.e., no cracks were formed in the film, again evidencing thermal oxidative stability.

What is claimed is:

1. A powder composition suitable for providing a thermally stable electrically insulative coating on wire when said composition is fused and cured thereon, the composition comprising a blend of a carboxyl-terminated polyester resin derived from at least one aromatic diacid and at least one aliphatic glycol; at least about 5 percent by weight of at least one diimide diacid derived from the reaction product of at least one tricarboxylic acid anhydride and at least one diamine; and at least one triglycidyl isocyanurate, said isocyanurate being present at a mol ratio of epoxide functionality to total acid functionality of from about 0.8 to about 1.5.

2. The powder composition of claim 1 wherein said anhydride is trimellitic anhydride and said diamiine is methylene dianiline.

3. The powder composition of claim 1 wherein said diimide diacid comprises less than about 40 percent by weight thereof.

4. The powder composition of claim 1 wherein the weight ratio of said polyester resin to said diimide diacid is at least about 0.9 to 1.

5. The powder composition of claim 1 wherein said mol ratio is about 1.25.

* * * * *